E. R. SIBERT.
CHUCK.
APPLICATION FILED MAR. 18, 1910.

973,985.

Patented Oct. 25, 1910.

Witnesses

Inventor
E. R. Sibert,
By James J. Sheehy,
Attorney

UNITED STATES PATENT OFFICE.

ERNEST RIDGLEY SIBERT, OF COLORADO SPRINGS, COLORADO.

CHUCK.

973,985. Specification of Letters Patent. Patented Oct. 25, 1910.

Application filed March 18, 1910. Serial No. 550,097.

*To all whom it may concern:*

Be it known that I, ERNEST RIDGLEY SIBERT, citizen of the United States, residing at Colorado Springs, in the county of El Paso and State of Colorado, have invented new and useful Improvements in Chucks, of which the following is a specification.

My present invention has to do with chucks, and more particularly to chucks for use on polishing or buffing lathes.

In my Letters-Patent No. 906,315, dated December 8, 1908, I disclose a chuck constructed with a view of saving time when it is desired to stay a tool carrier in order to examine work that is being turned or to remove a buff from the tool carrier and replace it with a buff of different character, the staying or stopping of the tool carrier in order to attain the end stated being accomplished without the necessity of stopping the lathe, which will be appreciated as an important advantage when it is remembered that where electric power is used the starting of the lathe involves the loss of considerable power.

One of the objects of my present invention is to provide a chuck equally as efficient as the one constituting the subject matter of my Letters-Patent aforesaid, and at the same time much more simple and inexpensive than the same.

Another object of the present invention is the provision of means whereby when occasion demands the tool carrier of the chuck may be detachably fixed to the shift sleeve thereof, this with a view of preventing the tool carrier going into operation— *i. e.*, being turned by the arbor when a tool is fixed on the tool carrier in such a manner as to make necessary the use of a wrench or the like to loosen and remove the said tool.

Figure 1:
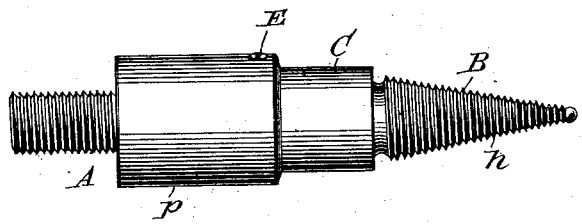
Figure 2:
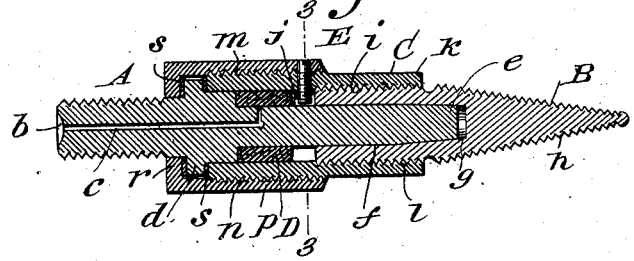
Figure 3:
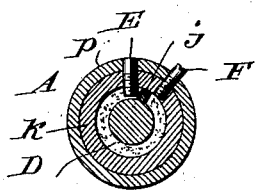

With the foregoing in mind the novelty, utility and practical advantages of the present invention will be fully understood from the following description and claims when the same are taken in connection with the drawings, accompanying and forming part of this specification, in which:

Figure 1 is a side elevation of my improved chuck. Fig. 2 is a longitudinal section of the same. Fig. 3 is a transverse section taken in the plane indicated by the line 3—3 of Fig. 2.

Similar letters designate corresponding parts in all of the views of the drawings, referring to which:

A is the arbor of my improved chuck, which is designed to be constantly rotated while the lathe or other machine embodying my improvements is in use.

B is a tool carrier which is shown specifically as a buff carrier, and C is a shift sleeve—*i. e.*, a sleeve having to do with putting the tool carrier into and out of working connection with the arbor, so that in one position the tool carrier derives rotary motion from the arbor, and in another position said tool carrier remains idle while the arbor continues to rotate.

As shown in Fig. 2, the arbor A is adapted for connection to the lathe element from which it is to derive motion, and is provided with the following features, to wit: an oil cup $b$, an oil duct $c$ extending from cup $b$ to the side of the arbor and designed to lead oil to the washer $m$, presently described, a circumferential flange $d$ located in rear of the eduction orifice of the oil duct $c$, and a slightly tapered forward end $e$.

The tool carrier B is provided with a socket $f$ the forward portion of which is tapered as indicated by $g$ to coöperate with the arbor portion $e$, and it will be observed that an oil vacuum is afforded between the forward end of the arbor and the opposed end wall of the socket $f$ in the tool carrier, the said oil vacuum having for its office to form a cushion at the forward end of the arbor to prevent the same becoming jammed in the socket of the tool carrier. The tool carrier shown is also provided with a forwardly tapered and exteriorly threaded portion $h$ and with a rear exteriorly threaded portion $i$, the latter terminating at its rear end in a longitudinal projection or reduced portion $j$, which I will hereinafter denominate the bank pin.

The shift sleeve C may be of any construction consonant with the purpose of my present invention, though I prefer to have it comprise a section $k$, interiorly threaded at $l$ to engage the exterior thread $i$ of the tool carrier B, and exteriorly threaded at $m$ to engage the interior thread $n$ of a section $p$, which section $p$ extends rearwardly beyond the arbor flange $d$ and is there provided with an inwardly directed flange $r$ which loosely surrounds the arbor A. Thus it will be manifest that the flange $d$ rests between the sleeve section $k$ and the flange $r$ of the sleeve section $p$, and consequently serves to prevent material endwise movement of the shift sleeve C on the arbor. With a view of preventing cutting or frictional wear of the parts and at the same time adapt the chuck to operate in a practically noiseless manner, I prefer to interpose hard fiber washers $s$ between the arbor flange $d$ and the two parts $k$ and $r$ of the shift sleeve.

D is a washer, of hard felt or other suitable hard absorbent material, which surrounds the arbor and the eduction orifice of the oil duct $c$, and is snugly interposed between the arbor and the part $k$ of shift sleeve C. The said washer D serves to supply the inclosed parts with oil so as to render the chuck self-lubricating for an indefinite period, and also serves to frictionally transmit motion to the shift sleeve C.

E is a projection which extends inwardly from the part $k$ of the shift sleeve C and is arranged in the same transverse plane as the bank pin $j$ of the tool carrier B, and is designed to coöperate with the said pin $j$ in the manner and for the purpose hereinafter set forth. The said projection E is preferably in the form of a screw which is threaded through the parts $p$ and $k$ of the shift sleeve to connect the said parts and extends inwardly from the part $k$ to engage the bank pin $j$.

F, Fig. 3, is an auxiliary screw which is arranged in the same transverse plane as the bank pin screw E, and is carried by the parts $k$ and $p$ of the shift sleeve. Normally the said screw F rests out of the path or orbit of the bank pin $j$, but when it is desired for any purpose to fix the tool carrier B to the shift sleeve C, the screw F is turned inwardly so as to cause the same to rest at the opposite side of the bank pin $j$, with reference to the projection or screw E, when, as will be readily manifest, rotary movement of the tool carrier B in the shift sleeve C will be prevented, and consequently the sleeve C cannot operate to draw the tool carrier into frictional connection with the arbor.

In the practical operation of my novel chuck, it will be observed that the washer D serves for the frictional transmission of motion from the arbor A to the shift sleeve C, and the interior thread of the said shift sleeve serves in combination with the thread $i$ of the tool carrier B to draw the said tool carrier toward the left so as to engage said tool carrier with the arbor at the friction portion $e$ thereof, and in that way assure the shift sleeve and the tool carrier turning with the arbor. When, however, the shift sleeve C is stayed or stopped, as by the machine attendant grasping and holding the same against rotation, the tool carrier is enabled to turn a limited distance within the shift sleeve and sufficiently far to carry said tool carrier out of frictional engagement with the arbor portion $e$. This will leave the tool carrier B at rest while the arbor A continues to rotate, and while said tool carrier is at rest a buff may be removed from the carrier and replaced with a buff of different character, or else the work that is being done may be examined. Then upon the release of the shift sleeve C and the rotation of same through the medium of the washer D, the tool carrier B will be drawn toward the left and into frictional connection with the arbor, and will be caused to turn with the arbor as first stated. When the tool carrier turns in and with respect to the shift sleeve C in the manner before described, it will be observed that the said tool carrier will move forwardly until the bank pin $j$ engages with the bank pin screw E.

In the event of the buff becoming fixed on the taper screw of the carrier B in such manner that the buff cannot be removed by hand, the operator while continuing to stay the shift sleeve C, turns the auxiliary screw F inwardly so as to cause the said auxiliary screw to assume a position at the opposite side of the pin $j$ and directly behind the said pin $j$. This will obviously prevent the carrier B being again rotated until the screw F is returned to its normal position shown in Fig. 3, and while the tool carrier is locked in the manner stated to the shift sleeve, the buff may be removed from the tool carrier through the medium of a wrench or other suitable implement.

Having described my invention, what I claim and desire to secure by Letters-Patent, is:

1. In a chuck, the combination of an arbor, a shift sleeve frictionally rotated from the arbor and having a thread and also having a projection, and a device adapted to be moved into and out of frictional connection with the arbor and having a thread engaging the thread of the shift sleeve and also having a bank pin for coöperating with the said projection of the shift sleeve.

2. In a chuck, the combination of an arbor, a shift sleeve frictionally rotated from the arbor and having a thread and also having a projection, a device adapted to be moved into and out of frictional connection with the arbor and having a thread engaging the thread of the shift sleeve and also having a pin for coöperating with the said projection of the shift sleeve, and an adjustable device carried by the shift sleeve and adapted in one position to rest out of the path of the bank pin and in another position to rest adjacent the bank pin and behind the same.

3. In a chuck, the combination of an arbor having a circumferential flange and also having a forward taper portion, a friction washer surrounding the arbor, an endwise movable and rotary device having a taper socket receiving the taper portion of the arbor and also having a thread and a bank pin, and a shift sleeve comprising connected parts disposed at opposite sides of the circumferential flange of the arbor and having a thread engaging that of the said endwise movable device and also having an inwardly extending projection adapted to coöperate with the bank pin of the device.

4. In a chuck, the combination of an arbor having a circumferential flange and also having a forward taper portion, a friction washer surrounding the arbor, an endwise movable and rotary device having a taper socket receiving the taper portion of the arbor and also having a thread and a bank pin, a shift sleeve comprising connected parts disposed at opposite sides of the flange on the arbor and having a thread engaging that of the said endwise movable device and also having an inwardly extending projection adapted to coöperate with the bank pin of the device, and an auxiliary screw carried by the shift sleeve and adapted in one position to rest adjacent the bank pin and at the opposite side thereof to the projection on the shift sleeve.

In testimony whereof I have hereunto set my hand in presence of two subscribing witnesses.

ERNEST RIDGLEY SIBERT.

Witnesses:
    CHAS. F. BIRDSALL,
    E. KLOEPFER.